(12) United States Patent
Clowes et al.

(10) Patent No.: US 9,172,200 B2
(45) Date of Patent: *Oct. 27, 2015

(54) SEEDED OPTICAL AMPLIFIER APPARATUS FOR PRODUCING FEMTOSECOND PULSES

(71) Applicant: Fianium Ltd., Southampton (GB)

(72) Inventors: John Redvers Clowes, New Milton (GB); Anatoly Borisovich Grudinin, Southampton (GB); Pascal Dupriez, Leognan (FR)

(73) Assignee: Fianium Ltd., Southampton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/249,833

(22) Filed: Apr. 10, 2014

(65) Prior Publication Data

US 2014/0218789 A1    Aug. 7, 2014

Related U.S. Application Data

(63) Continuation of application No. 12/867,475, filed as application No. PCT/GB2008/051135 on Nov. 28, 2008, now Pat. No. 8,731,008.

(30) Foreign Application Priority Data

Feb. 12, 2008    (GB) .................................. 0802562.9

(51) Int. Cl.
*H01S 3/30*    (2006.01)
*H01S 3/00*    (2006.01)
(Continued)

(52) U.S. Cl.
CPC ............. *H01S 3/0057* (2013.01); *H01S 3/0092* (2013.01); *H01S 3/067* (2013.01); *H01S 3/06754* (2013.01); *H01S 3/10007* (2013.01); *H01S 3/10084* (2013.01); *H01S 3/2308* (2013.01); *H01S 3/0078* (2013.01); *H01S 3/06725* (2013.01); *H01S 3/06741* (2013.01);
(Continued)

(58) Field of Classification Search
CPC . H01S 3/067; H01S 3/10084; H01S 3/10007; H01S 3/0057; H01S 3/0092; H01S 3/06754; H01S 3/2308
USPC ........................................................ 372/6, 25
See application file for complete search history.

(56) References Cited

U.S. PATENT DOCUMENTS 7,508,853 B2 *    3/2009    Harter et al. ..................... 372/30
8,731,008 B2 *    5/2014    Clowes et al. ..................... 372/6
(Continued)

OTHER PUBLICATIONS

D.B.S Soh et al., "A 980-nm Yb-Doped Fiber MOPA Source and Its Frequency Doubling", IEEE Photonics Technology Letters, vol. 16, No. 4, Apr. 2004, pp. 1032-1033.
(Continued)

*Primary Examiner* — Kinam Park
(74) *Attorney, Agent, or Firm* — Peter Rainville

(57) ABSTRACT

A source of femtosecond optical pulses comprises a seed pulse source arranged to generate seed pulses; an optical amplifier downstream of the seed pulse source, the optical amplifier having a gain bandwidth; a nonlinear optical element downstream of the amplifier, the optical element spectrally broadening optical pulses via a non linear process to have a spectral bandwidth that exceeds the gain bandwidth of the optical amplifier; and a pulse compressor downstream of the nonlinear optical element and arranged to reduce the temporal duration of optical pulses so as to provide output optical pulses having a femtoseconds time duration.

14 Claims, 12 Drawing Sheets

(51) Int. Cl.
  *H01S 3/067* (2006.01)
  *H01S 3/10* (2006.01)
  *H01S 3/23* (2006.01)
  *H01S 3/094* (2006.01)
  *H01S 3/16* (2006.01)

(52) U.S. Cl.
  CPC ......... *H01S 3/094007* (2013.01); *H01S 3/1618* (2013.01); *H01S 3/2316* (2013.01); *H01S 2302/00* (2013.01)

(56) References Cited

U.S. PATENT DOCUMENTS

| | | |
|---|---|---|
| 2005/0163426 A1 | 7/2005 | Fermann et al. |
| 2006/0120418 A1 | 6/2006 | Harter et al. |
| 2006/0209908 A1 | 9/2006 | Pedersen et al. |
| 2006/0263024 A1* | 11/2006 | Dong et al. ............... 385/125 |
| 2007/0171945 A1 | 7/2007 | Liu et al. |

OTHER PUBLICATIONS

Frederic Druon, Patrick Geroges, "20fs pulse compression using a photonic crystal fiber seeded by a diode pumped Yb:SyS laser", Fiber Lasers II; Technology, Systems and Applications, Proceedings of SPIE vol. 5709, 2005, pp. 1-12.

A. Bouchier et al., "Frequency doubling of an efficient continuous wave single-mode Yb-doped fiber laser at 978 nm in a periodically-poled MgO:LiNbO3 waveguide", Optics Express, 2005 vol. 13, No. 18, Sep. 5, 2005, pp. 6974-6979.

Kenji Taira et al., "Two-photon fluorescence imaging with a pulse source based on a 980-nm gain-switched laser diode", Optics Express, vol. 15, No. 5, Mar. 5, 2007, pp. 2454-2458.

J.K. Sahu. et al, "Jacketed air-clad cladding pumped ytterbium-doped fibre laser with wide tuning range", Electronics Letters, vol. 37, No. 18, Aug. 30, 2001, pp. 1116-1117.

W. J. Tomlinson et al., "Compression of optical pulses chirped by self-phase modulation in fibers", J. Optical Society of America B, vol. 1, No. 2, Apr. 1984, pp. 139-149.

J. Limpert et al., "High-power femtosecond Yb-doped fiber amplifier", Optics Express, vol. 10, 2002, No. 4, Jul. 15, 2002, pp. 628-638.

EPO communication, Invitation pursuant to article 94(3) and Rule 71(1) EPC May 30, 2011, (EP 8872381.2).

Annex A to EPO communication, Invitation pursuant to Article 94(3) and Rule 71(1) EPC May 30, 2011, (EP 8872381.2).

Nov. 2, 2010 Response to Sep. 22, 2010 EPO communication in EP08872381.2.

Description amendments Nov. 1, 2010 submitted in conjunction with Nov. 2, 2010 Response to Sep. 22, 2010 EPO communication in EP08872381.2).

Claims accompanying Nov. 2, 2010 Response to Sep. 22, 2010 EPO communication, request for replacement claims 1-17, U.S. Appl. No. 12/867,475 (EP08872381.2).

Mircea D. Guina, "Passively mode-locked 900 nm, picosecond fiber laser", Conference on Lasers and Electro-Optics (CLEO) 2004, Session CMAA3.

O.G. Okhotnikov et al., "Mode-locked ytterbium fiber laser tunable in the 980—1070-nm spectral range", Optics Letters, vol. 28, No. 17, Sep. 1, 2003, pp. 1522-1524.

Written Opinion and International Search Report, PCT/GB2008/051135 (Intl. Filing Date Nov. 28, 2008) Jun. 15, 2009.

D.N.S. Soh et al, "A 4.3 W 977 nm Ytterbium-doped Jacketed-Air-Clad Fiber Amplifier", Optical Society of America, Advanced Solid-State Photonics (ASSP) meeting, 2004 (3 pages).

Jan. 10, 2012 Reply to May 30, 2011 EPO communication in EP08872381.2.

Description amendments submitted in conjunction with Jan. 10, 2012 Reply to May 30, 2011 EPO communication in EP08872381.2).

Claims accompanying Jan. 10, 2012 Reply to May 30, 2011 EPO communication in EP08872381.2.

EPO communication dated Nov. 20, 2013 in EP08872381.2.

Applicant communication to EPO dated Feb. 27, 2014 in reply to Nov. 20, 2013 EPO communication EP08872381.2.

EPO Examiner Interview Summaries for Mar. 11 and 13, 2014 Interviews in EP08872381.2.

Applicant communication to EPO dated Mar. 18, 2014 in EP08872381.2.

EPO Decision to Grant Patent dated Sep. 25, 2014 in EP08872381.2.

* cited by examiner

SEEDED OPTICAL AMPLIFIER APPARATUS FOR PRODUCING FEMTOSECOND PULSES

CROSS-REFERENCE TO RELATED APPLICATIONS

This application is a continuation of U.S. patent application Ser. No. 12/867,475, filed on 3 Oct. 2010, which is a US National Stage application of PCT/GB2008/051135 having a International Filing Date of 28 Nov. 2008, which PCT application in turn claims priority to GB 0802562.9, filed 12 Feb. 2008. The foregoing applications are hereby incorporated by reference herein.

FIELD OF THE INVENTION

The present invention relates to methods and apparatus for providing femtosecond laser pulses, such as, for example, femtosecond laser pulses in the wavelength range 900-1000 nm.

SUMMARY

High-power femtosecond (sub 1 picosecond) pulses with wavelength centered around 980 nm are of great interest for applications including multi-photon microscopy, nonlinear optics (pumping optical parametric oscillators) and other nonlinear frequency conversion such as second harmonic generation, fourth harmonic generation, supercontinuum generation etc. Femtosecond pulses generated in the 900-1000 nm spectral range are typically produced by Ti:sapphire lasers. Although these sources produce clean transform-limited pulses in a very broad wavelength range with optimal performance near 800 nm, the lower available gain of the Ti:sapphire crystal at longer wavelengths near 900-1000 nm, severely restricts the average output power available from such lasers as shown in FIG. 1 (gain cross section $\sigma_g$ as a function of wavelength). As an example, a MIRA-HP Ti:sapphire laser manufactured by Coherent, produces up to 3.3 W at 800 nm but only 500 mW at 980 nm. Furthermore, while Ti:sapphire lasers offer wavelength tunability and flexibility, their complex design makes them expensive and unreliable for many applications. Ti:sapphire lasers also require the use of a second bulk solid-state laser emitting in the green wavelength range of the spectrum to pump its cavity, which requires a large power supply and cooling system thereby making the system dimensions unpractical for most applications.

Fibre lasers/amplifiers are an attractive alternative to the above systems. Power scaling of fibre lasers/amplifiers has been enabled by the development of double-clad fibres where low-brightness, high-power laser diodes can be employed to pump single-mode, rare-earth doped core to produce a high power, nearly diffraction limited beam. However, such fibres, characterised by a small core (typically 5-15 µm) and a large cladding (typically 125-400 µm), inherently operate between 1030 and 1120 nm and shifting the gain of these fibre systems to shorter wavelengths, while maintaining high efficiency and high power, has proved to be challenging.

Air-clad Ytterbium doped fibres (YDF) have been introduced to overcome this issue. YDF's enable high pump intensity and high population inversion for three-level operation ("J. K. Sahu et al., Electronics Letters 37 1116-1117 (2001)"). For YDF's with typical core size of 5-10 µm and an inner cladding of 30-50 µm (NA=0.6), end-pumping with a high-brightness pump laser diode as shown in FIG. 2 includes pump diode 1, Air clad Ytterbium doped fibre 2, 980 nm seed pulse source 3, Fibre Bragg grating with high reflectivity (FBG HR) at 980 nm 4).

This type of fibre laser/amplifier has been employed to produce high average power at 977 nm in continuous wave (CW) regime (up to 4 W, "D.B.S. Soh et al., ASSP 2004") and there are also reports of amplification of pulses with nanosecond ("A. Bouchier et al., Opt. Express 13, 6974-6979 (2005)") and picoseconds pulses ("A. B. Grudinin et al., CLEO 2003", "K. Taira et al., Opt. Exp. 15, 2454-2458 (2007)").

The generation of high power femtosecond pulses in standard Ytterbium double-clad fibre can be achieved employing techniques such as chirped pulse amplification (CPA), as illustrated in FIG. 3(a), or by direct amplification of picoseconds pulses (pulse durations of greater than 1 picosecond), as illustrated in FIG. 3(b). With CPA, the stretching, amplification and subsequent re-compression of the pulses enables the delivery of very high pulse energies but the system architecture is often very complex and requires a bulky and mechanically unreliable optical design. The technique of direct amplification of picosecond pulses relies on self phase modulation (SPM) induced in the fibre amplifiers to introduce a quasi-linear chirp, which can be compensated at the amplifier output via a dispersion compensation device, such as a fibre Bragg grating, as shown in FIG. 3 (master oscillator 5, stretcher 6, Ytterbium doped fibre amplifier chain 7, FBG 8, pulse P and pulse spectra S) to subsequently recompress the pulses.

In conventional YDF amplifiers where the four-level regime dominates between 1040 and 1080 nm, the fibre length can be fairly long and there is flexibility in the core dimension meaning that the amplifier can be tailored to produce adequate SPM for final pulse compression at the fibre amplifier output. Furthermore, the gain bandwidth at 1040 nm to 1080 nm exceeds 20 nm and is thus capable of supporting very short pulses. In this configuration, compressed femtosecond pulses are typically 3-5 times over the transform limit. FIG. 4 shows an example of the amplification of a 6 ps pulse at 1064 nm; after amplification, the strongly chirped pulses (FIG. 4a, pulse spectrum: Intensity I as a function of wavelength) occupy a 15 nm bandwidth resulting in 200 fs pulses after compression (FIG. 4b, intensity I as a function of time delay T).

Three-level operation in YDF's involve a much narrower gain bandwidth of only 6-8 nm (typically less than 6 nm for a uniform gain needed for high quality pulse amplification and compression). This gain bandwidth supports pulses of only 0.6 ps temporal duration (assuming a 5 times transform limit) and for high quality pulse compression a pulse duration of more than 1 psis required. The narrow gain bandwidth is associated with distortion in the compressed pulse shape and consequently lower peak power ("J. Limpert et al., Opt. Express 10, 628-638 (2002)"). In addition, the combined short fibre lengths and large mode field diameter of the core required to enhance gain at 980 nm, limit the amount of SPM produced along the fibre amplifier, and thus limit the temporal compression factor.

In accordance with the present invention, there is provided a source of femtosecond pulses in the wavelength range 900-1000 nanometers, the source comprising:

a seed pulse source arranged to generate pulses of lasing radiation at a wavelength in the range 900-1000 nanometers;

a fibre amplifier adapted to amplify the pulses and comprising an air-clad Ytterbium doped optical fibre and a pump laser operable to generate an optical pump signal at an optical power and wavelength to cause three-level operation of the fibre amplifier;

a nonlinear element adapted to produce spectral broadening of the pulses; and pulse compression apparatus arranged to reduce the temporal duration of pulses output from the fibre amplifier.

The invention enables femtosecond pulses to be generated at wavelengths in the range 900-1000 nm, and may be used to generate femtosecond pulses of high average power. The invention enables generation of femtosecond pulses after amplification of seed pulses in air-clad Yb doped fibre amplifiers operating on a three level system. The invention further enables the production of sufficient nonlinear chirp (with reasonable quality) after amplification in a three-level amplifier with narrow gain bandwidth and short length, which would otherwise normally impair the generation of femtosecond pulses, by the direct amplification of picoseconds seed pulses and subsequent pulse compression.

Since operation at 980 nm depends upon the core to cladding area ratio, use of an air-clad fibre with small inner cladding makes it possible to use relatively small cores to enable single mode operation of the fibre yet still attain high pump intensity and high population inversion necessary for three-level operation.

The seed pulse source is preferably operable to generate pulses of substantially 980 nanometers. The seed pulse source is preferably operable to generate picosecond pulses. The invention thus enables generation of femtosecond pulses by the amplification and subsequent compression of picoseconds pulses within air-clad Yb doped fibre amplifiers operating on a three level system. The invention further enables the production of sufficient nonlinear chirp after amplification in a three-level amplifier with narrow gain bandwidth and short length, which would otherwise normally impair the generation of femtosecond pulses by the direct amplification of picoseconds pulses and subsequent pulse compression.

The air-clad Ytterbium doped optical fibre is preferably a double-clad fibre. The use of double-clad fibre allows the fibre amplifier to be pumped by a higher power pump laser than is possible using single-clad fibre. The Ytterbium doped optical fibre preferably has a large core and a small cladding thereby suppressing the gain at 1032 nm and 1064 nm.

The Ytterbium doped optical fibre may be provided with filtering means, such as a depressed cladding. The depressed-cladding fibre geometry suppresses guidance of emission at four-level wavelengths and stimulated Raman scattering, and enables suppression of amplified spontaneous noise (ASE) at 1030-1040 nm. The Ytterbium doped optical fibre may be polarisation maintaining, providing stability and efficient pulse compression through the means for reducing the temporal duration of the pulses.

The non-linear element may comprise the Ytterbium doped optical fibre, the spectral broadening being caused by self-phase modulation of the pulses during propagation through the fibre. In this case, the Ytterbium doped optical fibre preferably has a low Ytterbium concentration and the length of the fibre is selected to produce the desired amount of spectral broadening. The fibre length can therefore be optimised to achieve the required amount of spectral broadening and the Ytterbium concentration correspondingly selected to produce optimal pump absorption, typically 10 dB. Use of a low Ytterbium concentration also reduces the unwanted effect of photo darkening.

The Ytterbium doped optical fibre is preferably a phosphosilicate Ytterbium doped optical fibre. Using phosphosilicate as the host material of the optical fibre significantly reduces or removes the effect of photo darkening on the operation of the fibre amplifier as compared to when alumino-silicate is used as the host material, as is the conventional arrangement. Power scaling is thereby made possible by changing the fibre composition to mitigate photo darkening, which can be very severe in this wavelength operating region.

The source may comprise a further non-linear element provided before or after the fibre amplifier and configured to produce spectral broadening through the mechanism of self-phase modulation. The further non-linear element is preferably configured to introduce a quasi-linear spectral chirp to the pulses during propagation, due to nonlinear optical effects, such as self-phase modulation. The further non-linear element may comprise a passive optical fibre. This is preferred where the further non-linear element is provided after the fibre amplifier. In this arrangement, the pulse signal is amplified to a power level within the optical fibre amplifier where its bandwidth remains below the amplifier gain bandwidth, thus avoiding deterioration in pulse quality due to non-uniform gain over the pulse spectrum. The spectrum of the amplified pulse is preferably then further broadened within the passive fibre without causing any spectral distortion of the pulses.

Preferably, the passive fibre is spliced to the Ytterbium doped fibre amplifier. The passive fibre is preferably structurally similar to the Ytterbium doped fibre; this helps to reduce the splice loss and ensures highly-efficient coupling of both pump and signals between the Ytterbium doped fibre and passive nonlinear fibre. The passive fibre does not produce any significant bandwidth limitation to the generation of additional spectral components as compared with the Ytterbium doped fibre and therefore does not clip the spectral bandwidth as compared with the Ytterbium doped fibre. The use of a passive fibre to generate the chirp and spectral bandwidth of the pulse without the deleterious effects of restricted gain bandwidth within the Ytterbium-doped amplifier enables the generation of femtosecond laser pulses with high quality via the means for reducing the temporal duration of the pulses.

The passive fibre may be single-clad fibre, The passive fibre may alternatively be an air-clad fibre, most preferably comprising a passive core. The passive fibre is preferably a depressed clad fibre, to thereby suppress emission at 1060 nm or stimulated Raman scattering. The passive fibre is preferably mode matched to the Ytterbium doped fibre.

Alternatively, the further non-linear element may comprise a second fibre amplifier. Where the further non-linear element is provided before the fibre amplifier, it is preferably configured to cause the seed pulses to be spectrally broadened to a spectral width which falls within or is equal to the gain bandwidth of the fibre amplifier, and the non-linear element is preferably configured such that nonlinear effects dominate over dispersion. This ensures that spectral broadening is produced without significant temporal broadening.

The fibre amplifier may be arranged to have a co-propagating pump signal or a counter-propagating pump signal.

The pulse compression apparatus, preferably comprises a dispersion compensator. The pulse compression apparatus may comprise a bulk grating pair, which may be configured in a single-pass or double-pass arrangement. Alternatively, the pulse compression apparatus may comprise a fibre grating based dispersion compensator, such as a fibre Bragg grating. The source can therefore be made as a fully fibre implemented device.

The invention enables generation of femtosecond pulses after amplification of picoseconds pulses from high-power, double-clad fibre amplifiers operating on a three level system. The invention further enables the production of sufficient nonlinear chirp after amplification in a three-level amplifier with narrow gain bandwidth and short length, which would otherwise normally impair the generation of femtosecond pulses, by the direct amplification of picoseconds pulses and pulse compression. The source of femtosecond pulses of the present invention further improves the reliability of fibre amplifiers where the high population inversion and high-powers involved typically results in rapid power degradation through photodarkening.

BRIEF DESCRIPTION OF THE DRAWINGS

Embodiments of the present invention will now be given by way of example only and with reference to the accompanying drawings in which:

FIG. 4a is the spectrum of a 200 fs pulse produced by the prior art direct amplification technique at 1064 nm;

FIG. 4b is the autocorrelation trace of the pulse of FIG. 4a;

FIG. 6a shows the optical spectrum (intensity I as a function of wavelength) of pulses output from the source of FIG. 5;

FIG. 6b is the autocorrelation trace (intensity I as a function of time delay T) of the spectrum of FIG. 6a;

FIG. 8a shows the optical spectrum (intensity I as a function of wavelength) of pulses output from the source of FIG. 7;

FIG. 8b is the autocorrelation trace (intensity I as a function of time delay T) of the spectrum of FIG. 8a;

FIG. 11a shows the optical spectrum (intensity I as a function of wavelength) of pulses output from source of FIG. 10;

FIG. 11b is the autocorrelation trace (intensity I as a function of time delay T) of the spectrum of FIG. 11a;

DETAILED DESCRIPTION

It will be appreciated by the person skilled in the art that the term femtosecond in relation to optical pulses is understood to mean optical pulses having a duration of less than one picosecond, i.e. on the order of femtoseconds ($1 \times 10^{-15}$), and typically 10 s or 100 s of femtoseconds.

Figure 1:
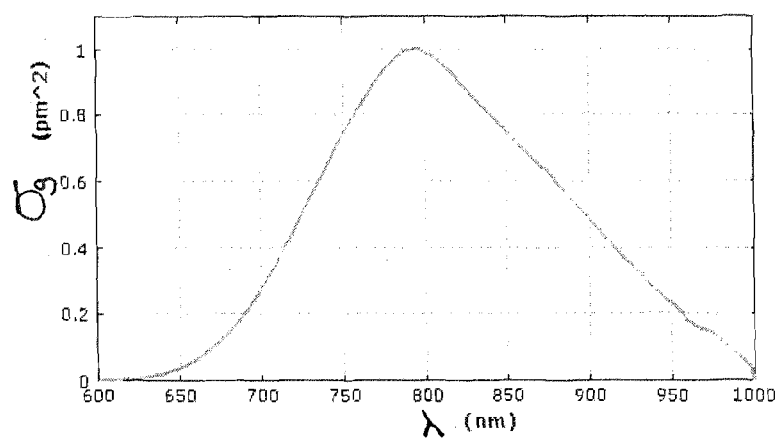
FIG. 1 is the emission cross-section of a prior art Ti:sapphire laser.
Figure 2:
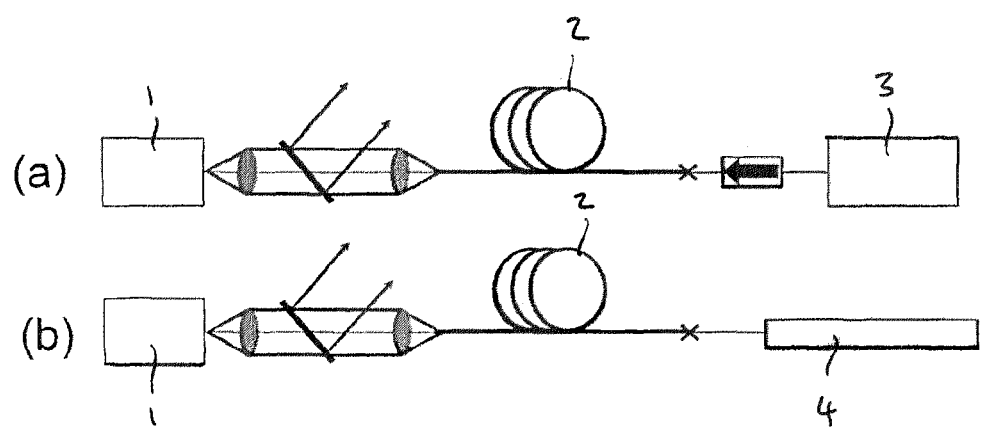
FIG. 2a is a schematic representation of a prior art 980 nm fibre laser source based on a Master Oscillator Power Amplifier (MOPA) configuration.
FIG. 2b is a schematic representation of a prior art 980 nm fibre laser source based on a laser configuration.
Figure 3:
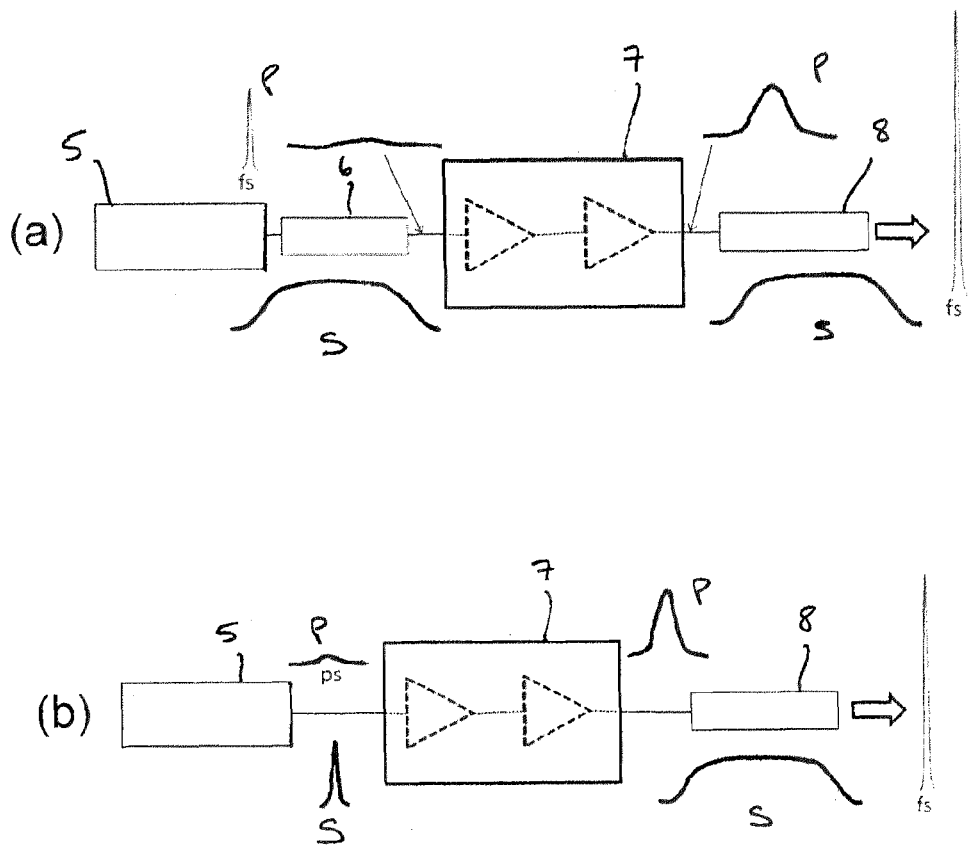
FIG. 3a is a schematic representation of the prior art technique used to produce high average power femtosecond pulses with fibre amplifiers employing chirped pulse amplification.
FIG. 3b is a schematic representation of the prior art technique used to produce high average power femtosecond pulses with fibre amplifiers employing direct amplification.
Figure 4:
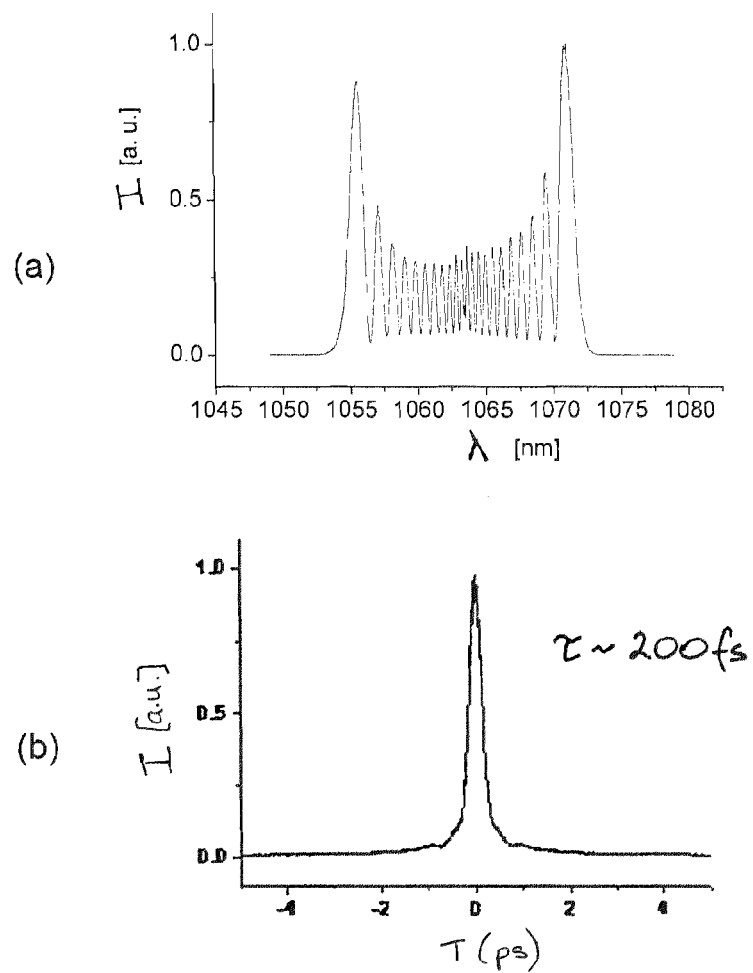
Figure 5:
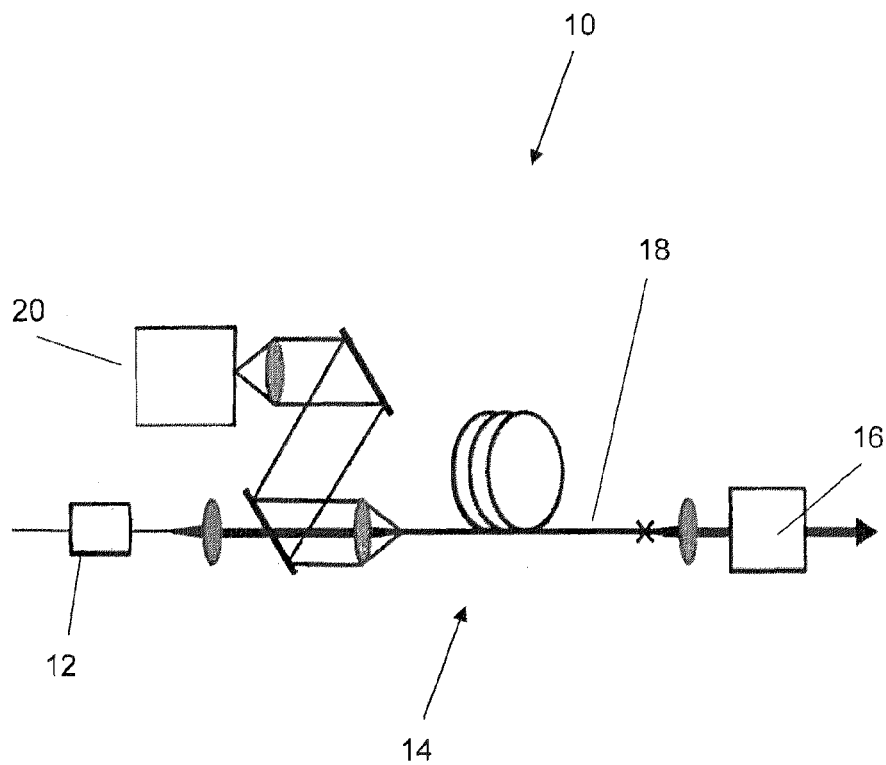
FIG. 5 is a schematic representation of a source of femtosecond pulses according to a first embodiment of the invention.
Figure 6:
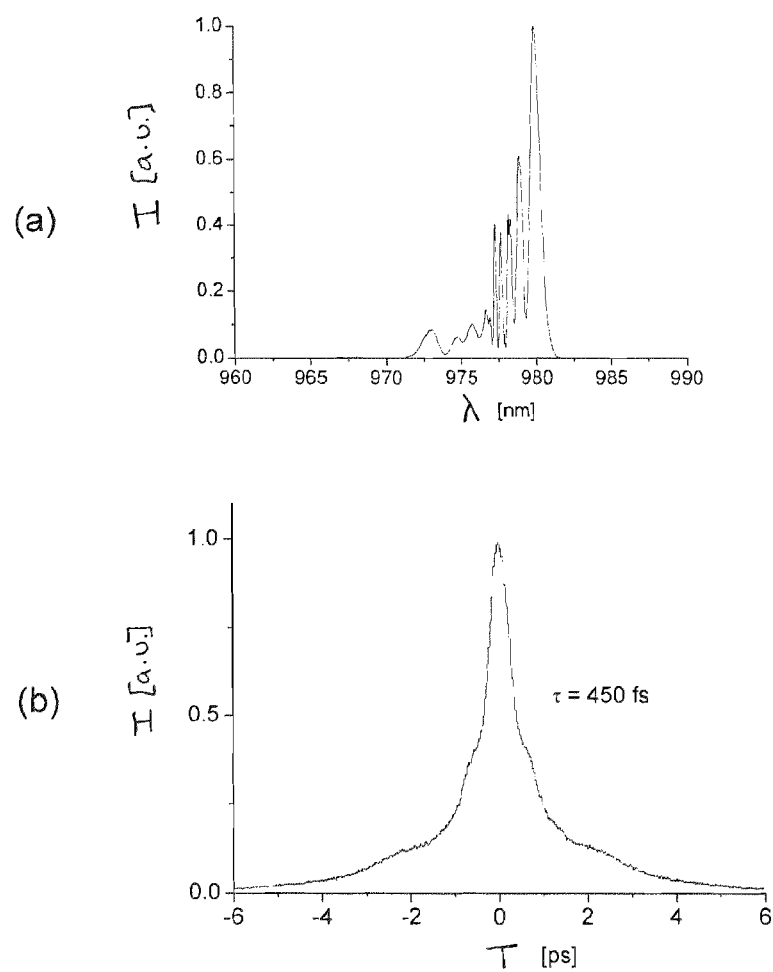

Referring to FIGS. 5 and 6, a source of femtosecond pulses 10 in the wavelength range 900-1000 nm according to a first embodiment of the invention comprises a seed pulse source 12, a Ytterbium (Yb) doped fibre amplifier 14 and a pulse compressor 16.

The pulse source 12 of this example is operable to generate 980 nm seed pulses having a pulse duration of 5 ps, average power of 30 mW and a pulse repetition rate of 20 MHz. The Yb doped fibre amplifier comprises a 10/35 µm air-clad Yb doped optical fibre 18 and a pump diode 20. The Yb doped fibre has a dopant concentration of $5 \times 10^{25}/m^3$ and a length of 1 m. The use of an air-clad fibre 20 maximizes pump intensity. Optimal efficiency is defined by optimal pump absorption (typically 10 dB) which depends on dopant concentration and the fibre length, the fibre length being inversely proportional to the Yb concentration. For example, in a 10/35 µm fibre with, 10 dB pump absorption corresponds to a 1 m long device. A concentration of $1 \times 10^{25}/m^3$ would enable the use of a 5 m long device for the same absorption. Consequently fibre length can be optimized by changing the Yb concentration, gain bandwidth becoming the main limitation for the generation of the spectral bandwidth necessary for femtosecond pulse generation and may lead to strong distortion after pulse compression.

The pump diode 20 is a high brightness single emitter laser diode or multi-emitter laser diode module operable at a pump wavelength in the region of 915 nm corresponding to a spectral region of high absorption within the Yb-doped fibre.

In this example the Yb-doped fibre 18 of the amplifier 14 is pumped in a co-propagating scheme. It will be appreciated however that the fibre can be pumped in either a counter or co-propagation scheme.

The nonlinear element adapted to produce spectral broadening of the pulses in this embodiment comprises the Yb doped fibre 18. The nonlinearities within the fibre give rise to self-phase modulation of the pulses, producing spectral broadening of the pulses. The length of the Yb doped fibre is selected to produce the required amount of spectral broadening, and the Yb concentration is selected in light of the fibre length to produce the required gain. The compressor 16 comprises a dispersion compensator, such as a bulk-grating-pair or fibre Bragg grating (FBG).

The optical spectrum of the fs pulses output from the source 10 is shown in FIG. 6a, and clearly shows the effects of non-uniform gain across the pulse spectral bandwidth, and an autocorrelation trace of the pulses is shown in FIG. 6b. The output pulses have an optical power of up to 1.5 W. An additional benefit of the use of a low Yb concentration is that of reduced photo darkening.

Figure 7:
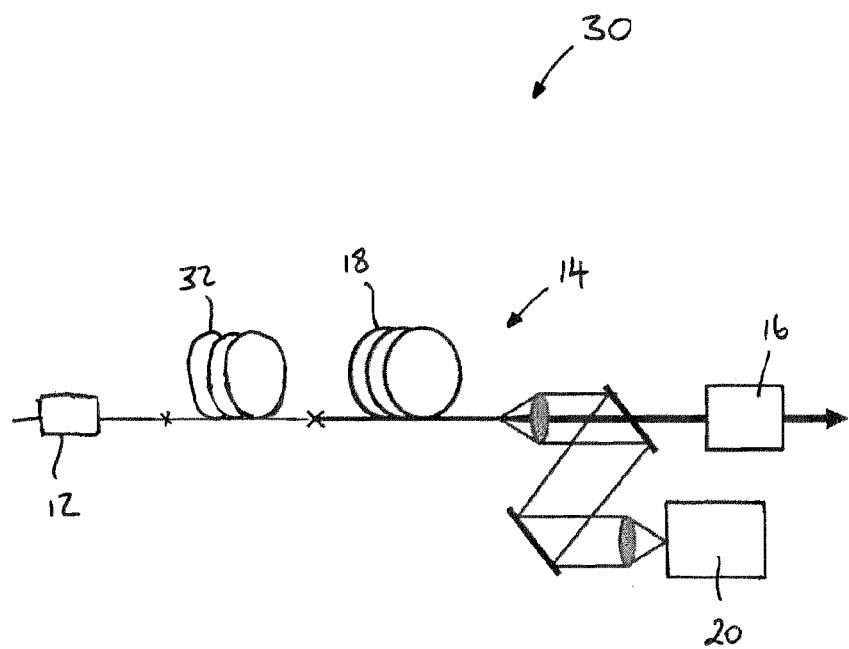
FIG. 7 is a schematic representation of a source of femtosecond pulses according to a second embodiment of the invention.
Figure 8:
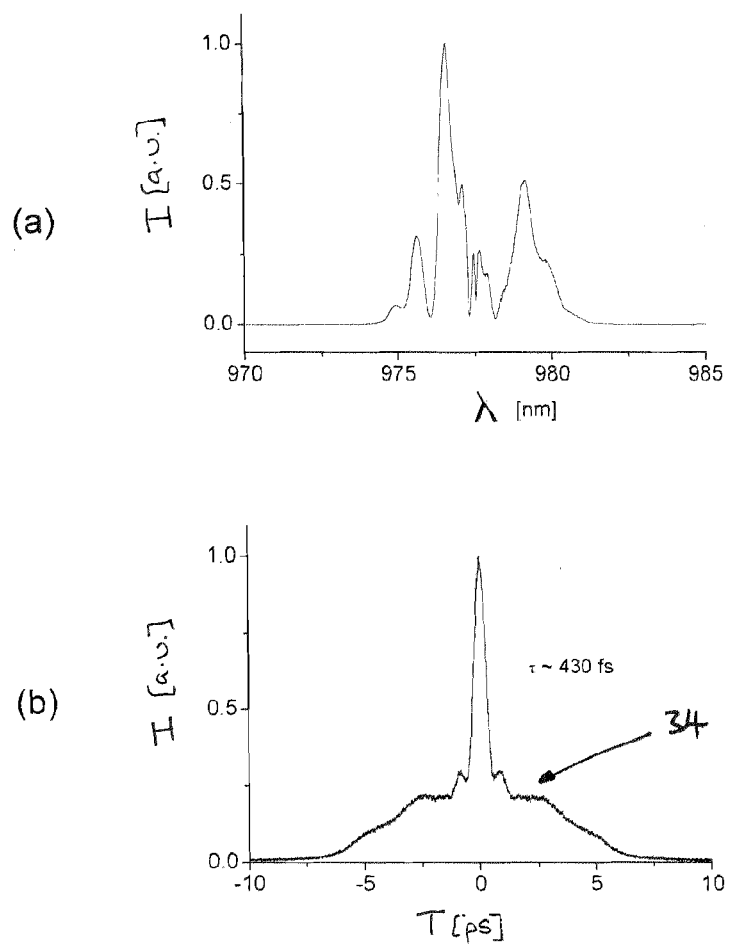

Referring to FIGS. 7 and 8, a second embodiment of the invention provides a source of femtosecond pulses 30 in the wavelength range 900-1000 nanometers which is substantially the same as the source 10 of the first embodiment, with the following modifications. The same reference numbers are retained for corresponding features.

In this embodiment the nonlinear element comprises a passive optical fibre 32, such as polarization maintaining Hi980 from Corning (single mode at 980 nm), provided before the fibre amplifier 14. The passive optical fibre 32 has a length of 4 m. The passive optical fibre 32 must be one where nonlinearities dominate over dispersion, to induce spectral broadening but not pulse broadening. In this arrangement, SPM is generated (in the passive optical fibre) before amplification in the fibre amplifier 14. The seed pulses are pre-chirped in the passive optical fibre 32 so that their spectral width is less than or equals that of the fibre amplifier 14 gain profile. Amplification in the fibre amplifier 14 will result in further spectral broadening of the pulses. The amplifier length (length of the Yb doped fibre) and output pulse power will depend on the optical characteristics of the input seed pulses. If the bandwidth of the seed pulses matches that of the fibre amplifier 14, then a very short amplifier must be employed to minimize further spectral broadening and gain bandwidth limitations.

The nonlinear element may alternatively comprise a second optical fibre amplifier, configured as a pre-amplifier, the active fibre of the pre-amplifier causing self phase modulation and spectral broadening of the seed pulses. For example, the pre-amplifier may comprise a single-clad Yb-doped fibre pumped by single mode laser diodes operating in the 915 nm spectral range, with pump and signal coupling provided through one or more conventional wavelength division multiplexing (WDM) coupler devices.

FIG. 8a shows the spectrum of the fs optical pulses output from the source of FIG. 7 and FIG. 8b shows an autocorrelation of one of the optical pulses. The seed pulses are again 980 nm pulses having a duration of 5 ps, 30 mW average power and a 20 MHz repetition rate. FIG. 8 also illustrates the bandwidth limitation in the case where the spectral bandwidth of the pre-chirped seed pulses is similar to the fibre amplifier gain bandwidth, FIG. 8a revealing spectral and pulse distortion and FIG. 8b showing a large pedestal 34 after compression.

Similarly to the first embodiment, the Yb doped fibre in the fibre amplifier 14 can be either co or counter-pumped.

In both the first and second embodiments, a pedestal is produced within the output fs pulses, following compression, which is unacceptable for many applications, particularly within multi-photon excitation microscopy where the pedestal contributes to unwanted thermal damage within a specimen.

Figure 9:
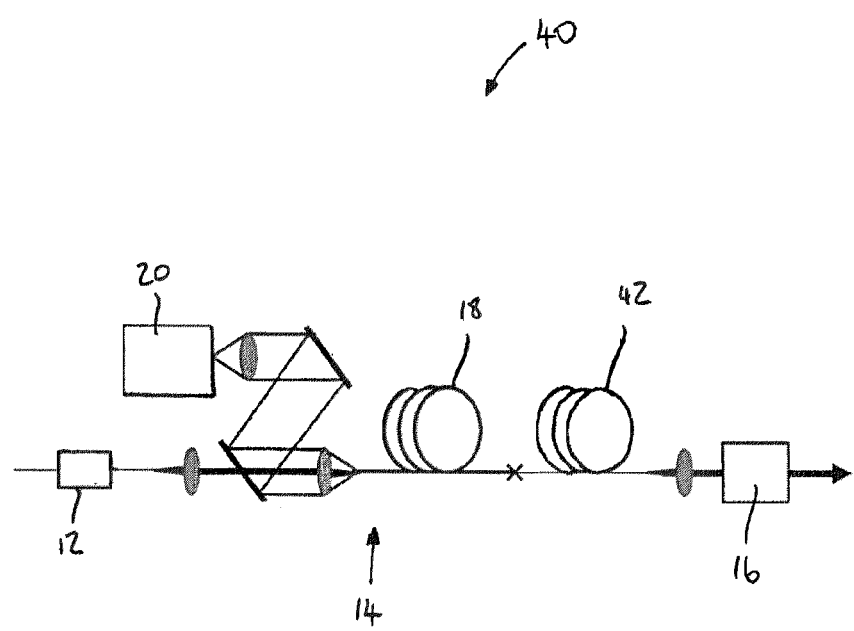
FIG. 9 is a schematic representation of a source of femtosecond pulses according to a third embodiment of the invention.

FIG. 9 illustrates a source of fs optical pulses 40 according to a third embodiment of the present invention which overcomes the gain bandwidth limitations of the previous embodiments. The optical source 40 is substantially the same as the optical source 10 of the first embodiment, with the following modifications. The same reference numbers are retained for corresponding features.

In this embodiment the nonlinear element comprises a passive optical fibre 42 provided after the fibre amplifier 14, in which most of the spectral broadening of the pulses occurs, again due to self phase modulation (SPM).

The passive fibre 42 can be a single-clad fibre and can have a depressed cladding layer, to provide a filtering function to suppress emission at 1060 nm 4 level wavelength or stimulated Raman scattering (SRS) emission. The waveguide properties of the passive fibre 42 ideally also match the amplifier characteristics, such as being polarization maintaining (PM) and the passive fibre 42 and the Yb doped fibre 18 are preferably mode matched. The length and core-size of the passive fibre 42 will determine the amount of SPM for a given amplified power.

In FIG. 9, the fibre amplifier 14 is pumped in a co-propagating scheme meaning that the passive fibre 12 can be a single-clad design. In this case, the pump beam is stripped out of the source 40 at the splice point between the Yb doped fibre 18 and the passive fibre 42.

In this case, the seed pulses can be pre-amplified up to a power level where the pulse bandwidth remains below the amplifier gain bandwidth and then further spectral broadening can happen in the passive fibre 42 without any spectral distortion, the only limit being stimulated Raman scattering (SRS).

Figure 10:
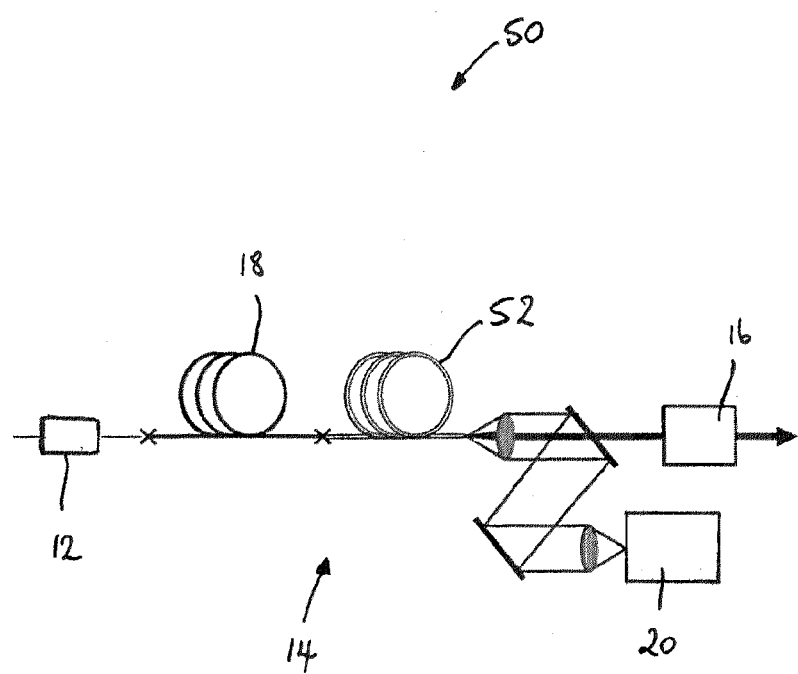
FIG. 10 is a schematic representation of a source of femtosecond pulses according to a fourth embodiment of the invention.

A source of fs optical pulses 50 according to a fourth embodiment of the present invention is shown in FIG. 10. The optical source 50 of this embodiment is substantially the same as the source 40 of the previous embodiment, with the following modifications. The same reference numbers are retained for corresponding features.

In this embodiment, the free-space launching of the seed pulses is removed by splicing the signal fibre to the air-clad Yb doped fibre 18 of the fibre amplifier 14 for enhanced stability.

The nonlinear element of this embodiment comprises a passive air-clad fibre 52 composed of a passive core with core and inner-cladding waveguide properties similar to the Yb doped fibre 18 of the amplifier 14, to reduce splice loss of both signal and pump light. The passive fibre 52 may also be depressed clad, in order to suppress 4 level wavelengths and SRS, and may be polarisation maintaining, etc, in order to match the fibre properties of the Yb doped fibre 18. The inner cladding of the passive fibre 52 acts as a pump delivery fibre and the passive core of the fibre 52 acts as the nonlinear element in which SPM is generated.

The pump diode 20 is coupled to the passive fibre 52 at the output end of the passive fibre, and a counter-propagating pump scheme is used. Launching the pump through the passive fibre 52 may improve power handling since the passive fibre generates minimum heat compared to active fibres. The pump beam propagates in the air-clad structure of the passive fibre, which matches that of the Yb doped fibre of the amplifier 14. The pump passes into the air-clad structure of the Yb doped fibre 18 with minimum loss at a splice point between the two fibres.

Figure 11:
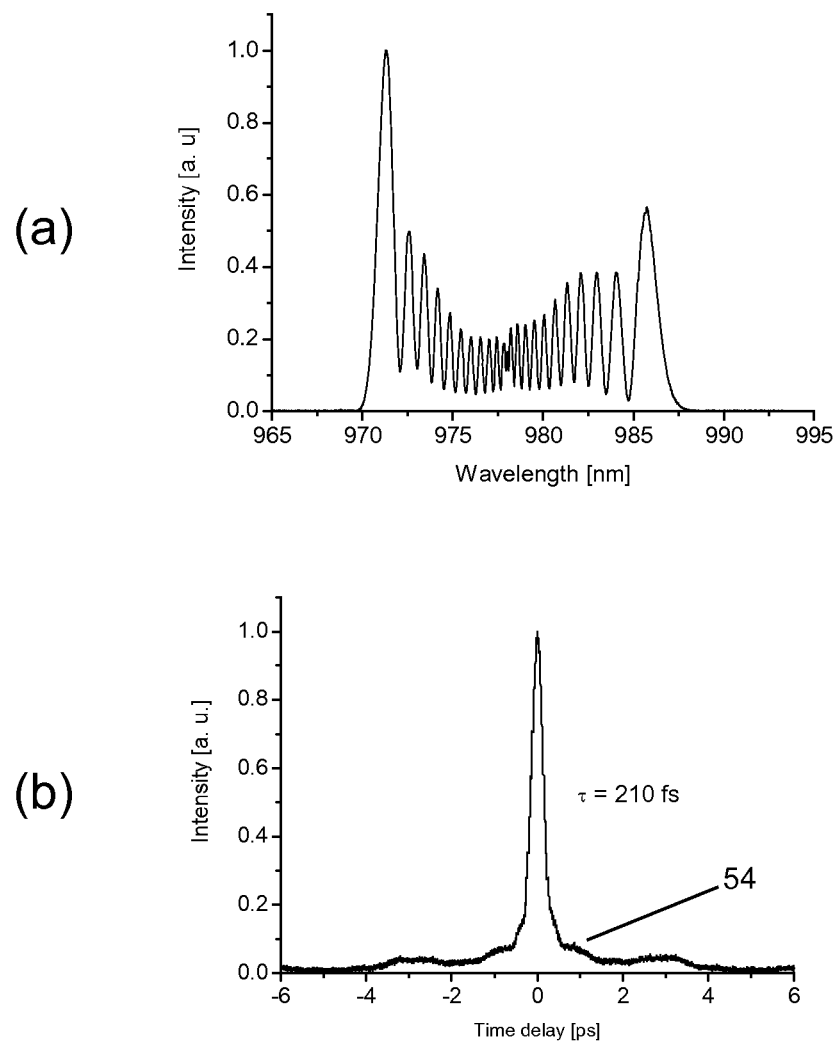

The optical spectrum of the pulses output from the source 50 and an autocorrelation trace of one of the output pulse are shown in FIGS. 11a and 11b, respectively. The spectral bandwidth of the output optical pulses exceeds the gain bandwidth of the Yb doped fibre 18 and the pulses have a duration of 200 fs. The spectrum shows little signs of gain bandwidth limitation, approximating that of classical SPM, and this is reflected in the quality of the compressed pulse which has a low pedestal 54.

A double-clad Yb doped fibre with suitable geometry is required to amplify a 980 nm signal, for example, with a doped core with a diameter of 5 to 10 μm and a numerical aperture of <0.1 to ensure single mode operation. The core can be homogeneously doped or ring-doped and additional waveguide filtering techniques can be implemented (depressed clad for example) to prevent guidance of the four-level wavelengths. A polarisation maintaining structure is preferred to ensure stability and efficient pulse compression through gratings for example. The Yb fibre can be single-clad, core-pumped by high-power single-mode laser diodes at 915 nm, however this limits the output power to <1 W due to power limits of such single-mode diodes. For power scaling at the watt level, a double-clad Yb doped fibre amplifier configuration is therefore preferred. Since high pump intensity is required to enhance gain at 980 nm, a small cladding diameter is required, <50 um for example. With such a small core, air-clad is required to increase brightness (typical inner cladding NA~0.6) whilst enabling a fibre design which can be handled, spliced and terminated. This enables the use of fibre-coupled, high-power laser diode with core diameter of 105 μm and NA=0.22.

The described embodiments provide a source of femtosecond optical pulses in the 980 nm spectral range from an Yb-doped fibre amplifier. The described embodiments overcome the deleterious effects of limited gain bandwidth on the spectral and temporal quality of the pulse experience by prior art femtosecond pulse sources, enabling efficient and high-quality pulse compression, resulting in pulses with a minimum pedestal. The above embodiments have considered the following arrangements:

a) Direct amplification in low Yb concentration air-clad fibre, with co- or counter-propagating pump beam
b) In-fibre nonlinear chirping before fibre amplification
c) Co-propagating pump and signal in the fibre amplifier followed by a spliced passive fibre, designed to induce a given level of SPM
d) Direct amplification in the fibre amplifier composed of an active air-clad Yb doped fibre spliced to a passive air-clad fibre where the inner cladding acts as a pump delivery fibre and the passive core acts as a SPM generator.

Option d) is the preferred embodiment of this invention, but examples a) to c) will also achieve the desired results, but with lower stability, reliability and optical specification.

In an optical amplifier, the gain of a three-level system dominates over the gain of the four-level system when the average population inversion exceeds 50%. However, high population inversion induces power degradation in Yb doped fibres. This phenomenon is called photo darkening. Photo-induced absorption is more pronounced at shorter wavelengths, therefore the power of a 980 nm signal would degrade faster than a "four-level" signal (e.g. 1064 nm) ("J. J. Koponen et al., Opt. Express 14, 11539-11544 (2006)"). The rate of photodarkening can be mitigated by changing the fibre host composition. In standard host material such as aluminosilicate, increasing the aluminium concentration for example decreases photodarkening.

According to a fifth embodiment of the invention, there is provided a source of fs pulses which is substantially the same as any one of the previous embodiments, with the following modifications. In this embodiment, the active, Yb doped, optical fibre is an Yb doped air-clad fibre having a phosphosilicate fibre host composition and the pump diode operates at 940 nm.

Figure 12:
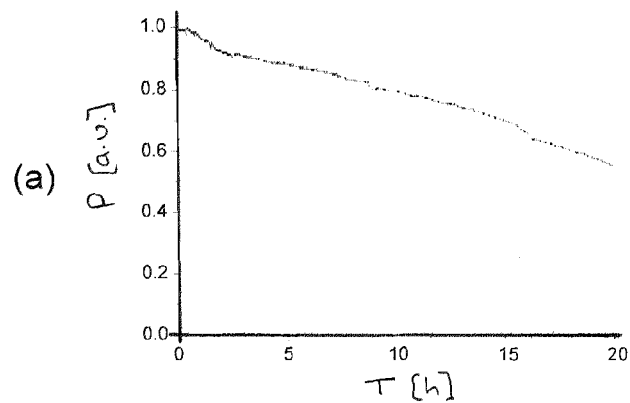
FIG. 12a shows the optical output power stability of an aluminosilicate Ytterbium doped fibre amplifier (normalised power P as a function of time T [hours])
FIG. 12b shows the optical output power stability of a phosphosilicate Ytterbium doped fibre amplifier (normalised power P as a function of time T [hours]).
Figure 12:
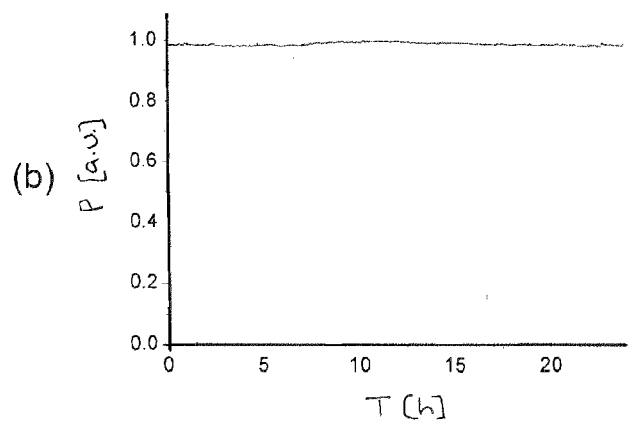

FIG. 12a shows the power stability at the output of a 1 m long Yb doped fibre amplifier with aluminosilicate host fibre composition operating at 1.2 W of average power. The graph reveals a 50% power drop over 20 hours (hr) due to photo darkening. The same characterization was carried out with a 1 m long Yb doped fibre amplifier having a phosphosilicate host fibre composition with similar output power. FIG. 12b shows that stable operation was achieved over a 24 hour period with no sign of photo darkening. Use of phosphosilicate host air clad Yb doped fibre in the fibre amplifier 14 of the source of the present invention therefore results in improved operating performance for the fs optical source. Use of a phosphosilicate host material for the amplifier fibre can thus increase the lifetime of a 980 nm fibre source by several orders of magnitude.

The described embodiments provide the advantage that they overcome the gain bandwidth limits present in three-level Yb doped fs pulse sources and they improve power handling. Power scaling of the output fs pulses is also made possible by the use of phosphosilicate host composition Yb doped fibre, to mitigate the effects of photo darkening, which can be very severe in the 900-1000 nm operating region.

The invention claimed is:

1. A source of femtosecond optical pulses, comprising:
a seed pulse source arranged to generate seed pulses;
an optical amplifier downstream of the seed pulse source, the optical amplifier having a gain bandwidth;
a nonlinear optical element downstream of the optical amplifier, the nonlinear optical element spectrally broadening optical pulses via a nonlinear process to have a spectral bandwidth that exceeds the gain bandwidth of the optical amplifier; and
a pulse compressor downstream of the nonlinear optical element and arranged to reduce the temporal duration of optical pulses so as to provide output optical pulses having a femtoseconds time duration.

2. The source of femtosecond optical pulses of claim 1 wherein the seed pulse source generates optical pulses having a time duration of greater than 1 picosecond.

3. The source of femtosecond optical pulses of claim 1 wherein said nonlinear optical element comprises an optical fibre.

4. The source of femtosecond optical pulses of claim 3 wherein said optical fibre comprises a passive optical fibre.

5. The source of femtosecond optical pulse of claim 3 wherein said optical fibre comprises a ytterbium doped optical fibre.

6. The source of femtosecond optical pulses of claim 1 wherein said pulse compressor comprises a fibre Bragg grating.

7. The source of femtosecond optical pulses of claim 1 wherein said pulse compressor comprises a bulk grating pair.

8. A method of generating femtoseconds output optical pulses from input optical pulses, comprising:
amplifying the optical seed pulses provided by a seed pulse source, the amplification process having a gain bandwidth;
spectrally broadening optical pulses, downstream of the amplification, using a non-linear process to provide optical pulses having a spectral bandwidth that exceeds the gain bandwidth; and
compressing optical pulses, downstream of the spectral broadening, so as to produce the output optical pulses having a femtoseconds time duration.

9. The method of claim 8 wherein the optical seed pulses have a time duration of greater than 1 picosecond.

10. The method of claim 8 wherein spectrally broadening comprises spectrally broadening using an optical fibre.

11. The method of claim 10 wherein the fibre comprises a ytterbium doped optical fibre.

12. The method of claim 10 wherein the fibre comprises a passive optical fibre.

13. The method of claim 8 wherein compressing comprises compressing optical pulses using a fibre Bragg grating.

14. The method of claim 8 wherein compressing comprises compressing optical pulses using a bulk grating pair.

* * * * *